United States Patent
Sakurai et al.

(10) Patent No.: US 6,965,599 B1
(45) Date of Patent: Nov. 15, 2005

(54) METHOD AND APPARATUS FOR RELAYING PACKETS BASED ON CLASS OF SERVICE

(75) Inventors: Hideshi Sakurai, Kawasaki (JP); Koji Torii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 949 days.

(21) Appl. No.: 09/714,295

(22) Filed: Nov. 17, 2000

(30) Foreign Application Priority Data

Dec. 3, 1999 (JP) ................................ 11-344107

(51) Int. Cl.[7] ...................... H04L 12/56; G06F 15/173
(52) U.S. Cl. ...................... 370/392; 370/401; 709/239
(58) Field of Search ................................ 370/219, 352, 370/389, 392, 401, 466, 475, 395.43; 709/223, 709/231, 245, 238, 239, 249

(56) References Cited

U.S. PATENT DOCUMENTS

| | | | |
|---|---|---|---|
| 6,101,552 A * | 8/2000 | Chiang et al. | 709/245 |
| 6,366,558 B1 * | 4/2002 | Howes et al. | 370/219 |
| 6,457,061 B1 * | 9/2002 | Bal et al. | 709/245 |
| 6,625,150 B1 * | 9/2003 | Yu | 370/389 |
| 6,683,874 B1 * | 1/2004 | Nagami et al. | 370/392 |
| 6,768,743 B1 * | 7/2004 | Borella et al. | 370/401 |
| 2002/0010799 A1 * | 1/2002 | Kubota et al. | 709/249 |
| 2002/0186698 A1 * | 12/2002 | Ceniza | 370/401 |

* cited by examiner

Primary Examiner—Alpus H. Hsu
Assistant Examiner—Lee Khuong
(74) Attorney, Agent, or Firm—Staas & Halsey LLP

(57) ABSTRACT

A packet relay apparatus is disposed that relays packets between an inside node and an outside IP network. A class processing unit classifies send packets to be relayed to the IP network and allocates different virtual IP addresses thereto. A send packet relay unit translates source addresses of the send packets to be relayed to the IP network into virtual IP addresses on a class by class basis, to establish classified IP communication paths. For reply packets from the IP network passing through communication paths on a class by class basis, a reply packet relay unit inversely translates destination virtual IP addresses into original addresses by reference to the results of address translation effected by the send packet relay unit.

10 Claims, 17 Drawing Sheets

FIG. 7

34 CLASS TABLE

| CLASS NAME | PROTOCOL TYPE | INSIDE | | OUTSIDE | | STATUS |
|---|---|---|---|---|---|---|
| | | ADDRESS | PORT | ADDRESS | PORT | |
| BUSINESS | TCP | ALL | 472 | ALL | ALL | FAIR |
| DEFAULT | ALL | ALL | ALL | ALL | ALL | FAIR |

FIG. 9

54 UDP HEADER FORMAT

| SOURCE PORT NUMBER | DESTINATION PORT NUMBER |
|---|---|
| PACKET LENGTH | CHECKSUM |
| DATA (UNFIXED LEENGTH) ||

32 BIT

FIG. 10

36 ADDRESS TRANSLATION RULE TABLE

| CLASS NAME | ADDRESS TRANSLATION | GATEWAY |
|---|---|---|
| BUSINESS | 10. 1. 2. 0 | 10. 1. 2. 1 |
| DEFAULT | 10. 1. 3. 0 | 10. 1. 3. 1 |

FIG.11

38 ADDRESS TRANSLATION TABLE

| PROTOCOL TYPE | PRE-TRANSLATION | | POST-TRANSLATION | |
|---|---|---|---|---|
| | ADDRESS | PORT | ADDRESS | PORT |
| TCP | 10.10.10.10 | 5000 | 10.1.2.10 | 2000 |
| UDP | 10.10.10.11 | 6000 | 10.1.3.11 | 2001 |
| ... | ... | ... | ... | ... |

FIG. 12

ADDRESS CONFIGURATION

| INTERFACE | ADDRESS | NETWORK MASK |
|---|---|---|
| NODE 10-1 | 10.1.1.10 | 255.255.255.0 |
| ROUTER 14-1 (LAN SIDE) | 10.1.1.1 | 255.255.255.0 |
| ROUTER 14-2 (LAN SIDE) | 10.1.1.2 | 255.255.255.0 |
| ROUTER 16-1 (LAN SIDE) | 10.1.2.1 | 255.255.255.0 |
| ROUTER 16-2 (LAN SIDE) | 10.1.3.1 | 255.255.255.0 |
| APPARATUS 12 (OUTSIDE) | 10.1.2.2 | 255.255.255.0 |
| APPARATUS 12 (OUTSIDE) | 10.1.3.2 | 255.255.255.0 |
| APPARATUS 12 (INSIDE) | 10.10.10.1 | 255.255.255.0 |
| NODE 10-2 | 10.10.10.10 | 255.255.255.0 |

○ ROUTER SIDE INTERFACE OF APPARATUS 12 IS NAMED OUTSIDE AND NODE 10-2 SIDE INTERFACE THEREOF IS NAMED INSIDE.

FIG. 13A

ROUTER 14-1 ROUTING TABLE

| DESTINATION SUBNETWORK | MASK | GATEWAY |
|---|---|---|
| 10.1.1.0 | 255.255.255.0 | DIRECT (DIRECT CONNECTION) |
| 10.1.2.0 | 255.255.255.0 | ROUTER 16-1 |

FIG. 13B

ROUTER 14-2 ROUTING TABLE

| DESTINATION SUBNETWORK | MASK | GATEWAY |
|---|---|---|
| 10.1.1.0 | 255.255.255.0 | DIRECT (DIRECT CONNECTION) |
| 10.1.3.0 | 255.255.255.0 | ROUTER 16-2 |

FIG. 13C

ROUTER 16-1 ROUTING TABLE

| DESTINATION SUBNETWORK | MASK | GATEWAY |
|---|---|---|
| 10.1.2.0 | 255.255.255.0 | DIRECT (DIRECT CONNECTION) |
| 10.1.1.0 | 255.255.255.0 | ROUTER 14-1 |

FIG. 13D

ROUTER 16-2 ROUTING TABLE

| DESTINATION SUBNETWORK | MASK | GATEWAY |
|---|---|---|
| 10. 1. 3. 0 | 255. 255. 255. 0 | DIRECT (DIRECT CONNECTION) |
| 10. 1. 1. 0 | 255. 255. 255. 0 | ROUTER 14-2 |

FIG. 13E

NODE 10-1 ROUTING TABLE

| DESTINATION SUBNETWORK | MASK | GATEWAY |
|---|---|---|
| 10. 1. 1. 0 | 255. 255. 255. 0 | DIRECT (DIRECT CONNECTION) |
| 10. 1. 2. 0 | 255. 255. 255. 0 | 10. 1. 1. 1 (ROUTER 14-1) |
| 10. 1. 3. 0 | 255. 255. 255. 0 | 10. 1. 1. 2 (ROUTER 14-2) |

FIG. 13F

NODE 10-2 ROUTING TABLE

| DESTINATION SUBNETWORK | MASK | GATEWAY |
|---|---|---|
| 10. 10. 10. 0 | 255. 255. 255. 0 | DIRECT (DIRECT CONNECTION) |
| 0. 0. 0. 0 (DEFAULT) | 0. 0. 0. 0 | 10. 10. 10. 1 (APPARATUS 12) |

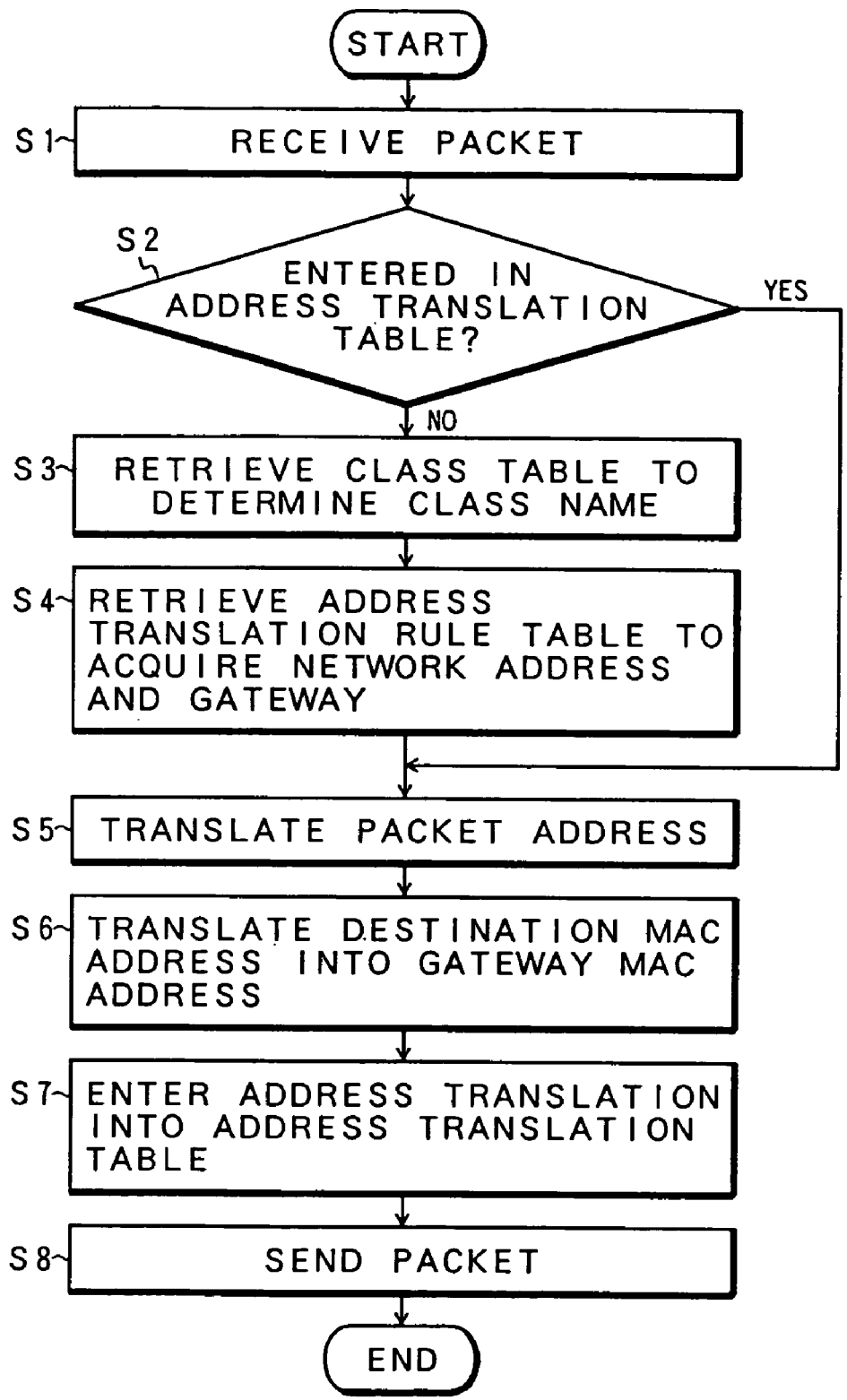

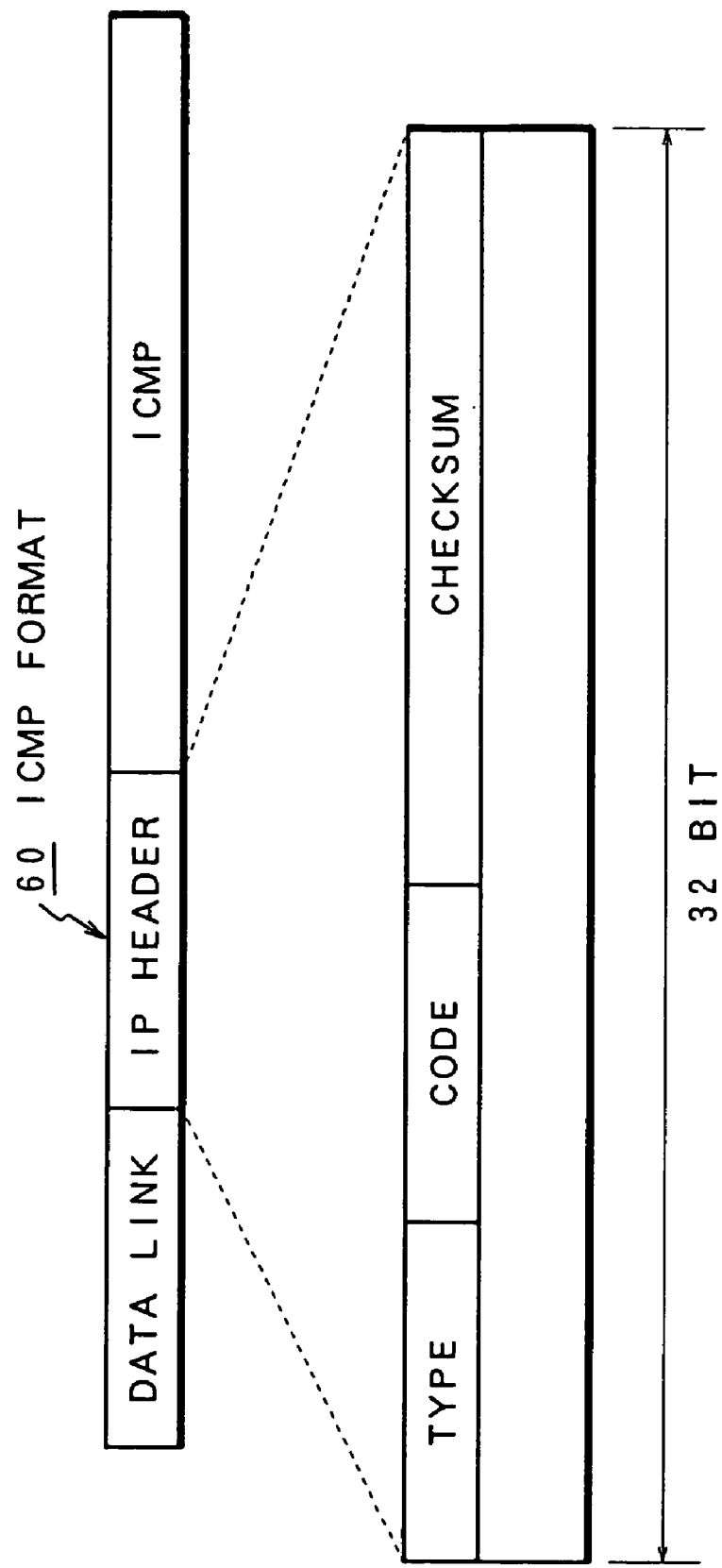

F I G. 1 7
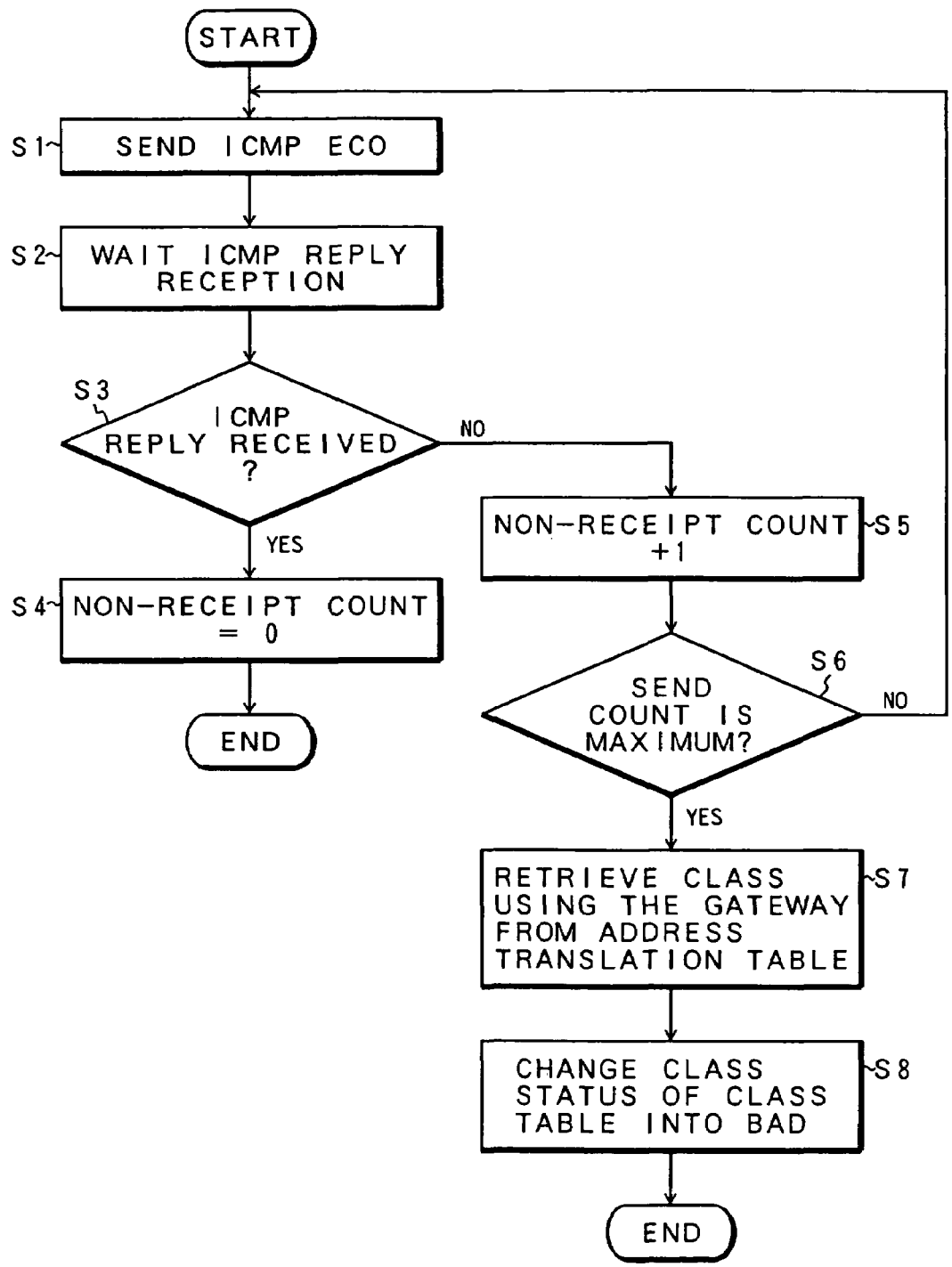

mstrong>METHOD AND APPARATUS FOR RELAYING PACKETS BASED ON CLASS OF SERVICE

BACKGROUND OF THE INVENTION

1. Field of the Invention

The present invention relates generally to an apparatus and a method for relaying packets on an IP network, and more particularly to a packet relay apparatus and method providing a control of communication paths within the network depending on the types of applications.

2. Description of the Related Arts

In the conventional internet protocol network (hereinafter referred to as "IP network") such as Internet or intranets, there intermingle various communications including client applications, business applications, file transfer, mails and voices, so that grading of communication qualities on a communication by communication basis, called QOS (quality of service) poses a problem. The grading of the communication quality is performed for example such that a highest communication priority is imparted to the client applications so that a certain voice band is constantly assured, with the communications for the file transfer and mails being suppressed to such a degree as not to impede the other communications. It is problematic in this case how to realize the demands for the thus graded communication qualities. The quality of service QOS is especially essential in a relatively low-speed network such as a wide area network (hereinafter referred to as WAN) whose bands are apt to become full, rather than in a high-speed network such as a local area network (hereinafter referred to as LAN). Two approaches lie to the quality of service QOS, one being how to realize the quality of service demanded, the other being how to separately use a plurality of different communication paths provided. For the separate use of the plurality of communication paths, a packet relay apparatus, typically called, e.g., a layer 4 switch (L4 switch) is provided that uses different packet destinations depending on the applications. When judging the application as a result of analysis of the contents of a packet, this packet relay apparatus sends the packet to the next packet relay apparatus corresponding to the application.

FIG. 1 is an explanatory diagram of a communication form using the packet relay apparatus using different packet destinations depending on the applications. A LAN 101-1 includes a node 100-1 and is followed by a packet relay apparatus 102-1 that uses different packet destinations depending on the applications. In this case, the packet relay apparatus 102-1 is connected via routers 104-1 and 104-2 to an IP network 108 such as WAN or Internet. A LAN 101-2 includes a node 100-2 and is followed by a packet relay apparatus 102-2 that uses different packet destinations depending on the applications. In this case, the packet relay apparatus is connected via routers 106-1 and 106-2 to the IPnetwork 108. In case of the business application, the packet relay apparatuses 102-1 and 102-2 designate the routers 104-1 and 106-1 so that the packet is passed through a communication path 110-1. For the other applications, the packet relay apparatuses 102-1 and 102-2 designate the routers 104-2 and 106-2 so that the packet is passed through a communication path 110-2.

However, in the event of provision of the packet relay apparatuses on a LAN by LAN basis as in FIG. 1, when communications are made between n LANs 100-1 to 100-n by way of the IP network 108 as shown in FIG. 2, a corresponding number of packet relay apparatuses 102-1 to 102-n to the number of LANs are required, resulting in a steep rise of the system costs. Thus, the inventors of this application have conceived that as shown in FIG. 3 the packet relay apparatus 102-1 is disposed only on the LAN to which belongs a specific node 100-1 executing the application, with 1: (n−1) communications between the node 100-1 and the other nodes 100-2 to 100-n using different packet destinations depending on the applications.

FIG. 4 illustrates in an exclusive manner the communication form of the nodes 100-1 and 100-2 of FIG. 3. This is a communication form without the packet relay apparatus 102-2 on one hand of FIG. 16. The node 100-1 sets the packet relay apparatus 102-1 as the default gateway, whereas the node 100-2 sets the router 106-2 as the default gateway. The packet relay apparatus 102-1 is designed so as to send only a business application packet to the router 104-2. If the node 100-1 issues a business application packet at that time, then the packet relay apparatus 102-1 sends the packet to the router 104-2 in compliance with the design, the packet arriving at the node 100-2 by way of the communication path 110-2. However, when the node 100-2 returns the business application packet, it delivers the packet to the router 106-1 that is a default gateway, the packet arriving at the node 100-1 by way of the communication path 110-1. In other words, the send packet belonging to the node 100-1 business application is delivered via the communication path 110-2 to the node 100-2, whereas the reply packet belong to the business application from the node 100-2 is returned via the other communication path 110-1 to the node 100-1. For this reason, separate use is impossible that the business application is exclusively passed through the communication path 110-2, with the other application being passed through the communication path 110-2.

SUMMARY OF THE INVENTION

According to the present invention there are provided packet relay apparatus and method capable of controlling so as to allow packets to pass through application dependant communication paths in a reciprocative manner, the packet relay apparatus being disposed on only one side of nodes for packet communications.

The present invention provides a packet relay apparatus for relaying packets between an inside node and an outside IP network. The packet relay apparatus comprises a class processing unit, a send packet relay unit and a reply packet relay unit. The class processing unit is arranged to classify send packets to be relayed to the IP network, depending on the types of applications and make allocation of different virtual IP addresses (10.1.2), (10.1.3) on a class by class basis. The send packet relay unit is arranged to translate a source address (10.10.10.10) of the send packet to be relayed to the IP network into a virtual IP address (10.1.2.10) or (10.1.3.10) on a class by class basis, and establish IP communication paths on a class by class basis in the IP network. The reply packet relay unit is arranged to inversely translate a destination address (10.1.2.10) or (10.1.3.10) of a reply packet from the IP network passing through the IP communication paths on a class by class basis into an original address (10.10.10.10) by reference to the results of address translation effected by the send packet relay unit. Such a disposition of a single packet relay apparatus of the present invention on a communication path enables different communication paths for the same destination to be used depending on the applications. Thus, by providing a control so as to allow the application requiring a high quality of service (QOS) to use its dedicated communication path, it is possible to absolutely keep the quality of communication.

The packet relay apparatus of the present invention comprises a class table having packet header information entered therein correspondingly to class names defining the types of the applications; an address translation rule table having virtual IP addresses and path information entered therein correspondingly to the classes; and an address translation table having therein entered the results of address translation from the packet source addresses into the virtual IP addresses. Correspondingly to these tables, the send packet relay unit upon receipt of a send packet to the IP network refers to the address translation table to retrieve a source virtual IP address. The send packet relay unit if there is no entry in the address translation table determines a class by reference to the class table and thereafter refers to the address translation rule table to retrieve a virtual IP address corresponding to the class. The send packet relay unit translates a send packet source address into the retrieved virtual IP address to enter the result of the address translation into the address translation table. The reply packet relay unit upon receipt of a reply packet from the IP network refers to the address translation table 34 to retrieve a destination address corresponding to a destination virtual IP address. The reply packet relay unit inversely translates the destination virtual IP address of the packet into the retrieved destination address. The class table has protocol types, send packet source addresses and port Nos. and reply packet source addresses and port Nos. entered correspondingly to the class names. The class retrieval unit retrieves a class from a combination of a protocol type of a send packet to be relayed to the IP network and a port No. For example, the class table has class names of a business application entered in the form of combinations of send packet TCP protocols and port Nos., the class table having all of the combinations of the other protocol types of the send packets and source port Nos. entered by class names of a default application. The address translation rule table has virtual IP addresses and gateway MAC addresses entered correspondingly to class names entered in the class table. The send packet relay unit 42 retrieves a virtual IP address and a gateway MAC address corresponding to a class name retrieved from the address translation rule table. The address translation table has pre-translation source addresses and port Nos. and post-translation virtual IP addresses and port Nos. entered correspondingly to protocol types. In this case, the send packet relay unit translates a send packet source address into a virtual IP address retrieved from the address translation rule table or the address translation table, and translates a destination MAC address into a gateway MAC address retrieved from the address translation rule table. The reply packet relay unit inversely translates a destination virtual IP address received from the IP network into a pre-translation source address retrieved from the address translation table.

The packet relay apparatus of the present invention further comprises a communication path validation unit arranged to make a periodical validation of communication through a communication path of the IP network by use of the virtual IP address. The communication path validation unit when detecting an abnormal of the communication path prohibits a retrieval of a class that uses the communication path, to make a changeover to use of a default communication path. More specifically, the class table includes a status indicative of usable or unusable. The communication path validation unit when detecting an abnormal of the communication path sets unusable in the status of the class table to prohibit a class retrieval. For this reason, even though a failure occurs on a specific application dependent communication path, the packet communication is ensured by use of the other normal communication paths.

The present invention further provides a method of relaying packets between an inside node and an outside IP network, the method comprising the steps of classifying send packets to be relayed to the IP network, depending on the types of applications, to allocate a different virtual IP address to each class; translating source addresses of the send packets to be relayed to the IP network into virtual IP addresses on a class by class basis to establish IP communication paths on a class by class basis in the IP network; and inversely translating destination addresses of reply packets from the IP network passing through the IP communication path on a class by class basis into original addresses by reference to the results of address translation in the send packet relaying step.

The other details of the packet relay method are substantially the same as those of the above apparatus configuration.

The above and other objects, aspects, features and advantages of the present invention will become more apparent from the following detailed description when read in conjunction with the accompanying drawings.

BRIEF DESCRIPTION OF THE DRAWINGS

FIG. 7 is an explanatory diagram of a class table of FIG. 6;

FIG. 9 is an explanatory diagram of a UDP header format;

FIG. 10 is an explanatory diagram of an address translation rule table of FIG. 6;

FIG. 11 is an explanatory diagram of an address translation table of FIG. 6;

FIG. 12 is an explanatory diagram of an address configuration in the communication form of FIG. 6;

FIGS. 13A to 13F are explanatory diagrams of a node of FIG. 6 and a routing table possessed by a router;

FIG. 14 is a flowchart of an inside to outside packet relay processing in accordance with the present invention;

FIG. 16 is an explanatory diagram of an ICMP echo format for use in a communication path validation unit of FIG. 3;

FIG. 17 is a flowchart of communication validation processing of a path in accordance with the present invention.

DETAILED DESCRIPTION OF THE PREFERRED EMBODIMENTS

Figure 5:
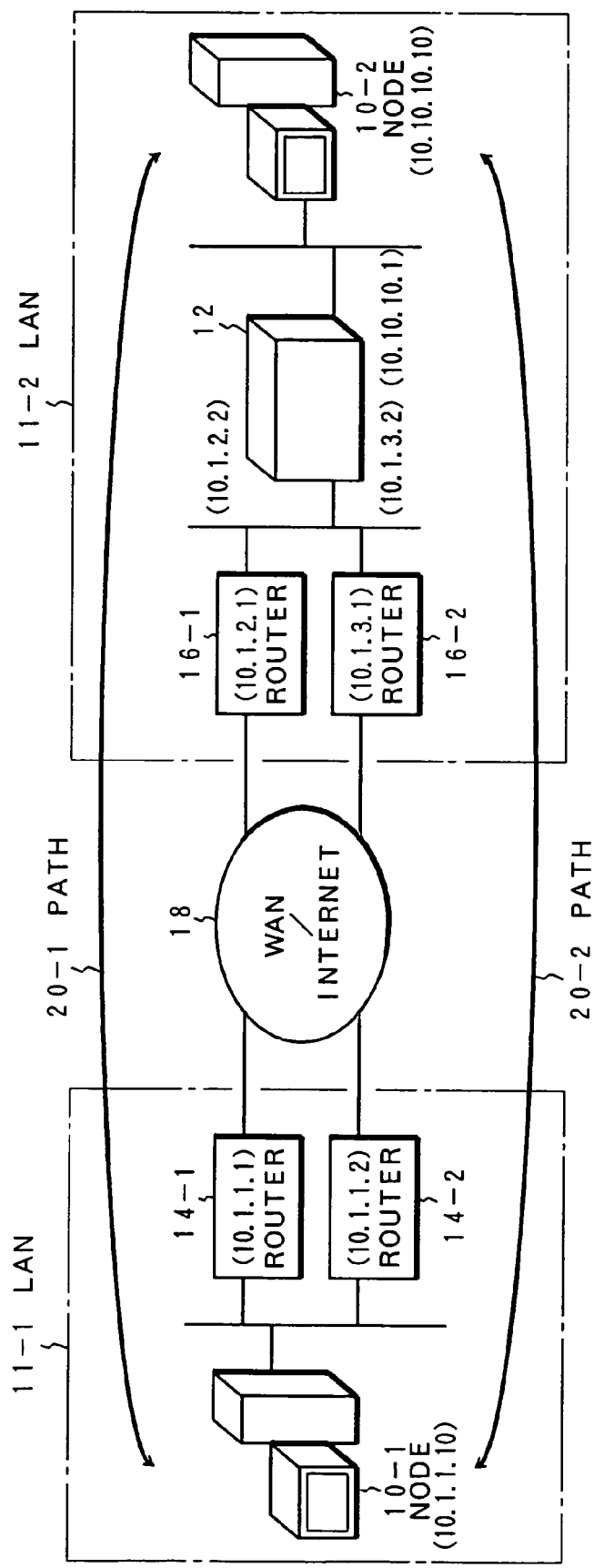
FIG. 5 is an explanatory diagram of a communication form employing the present invention.

FIG. 5 is an explanatory diagram of a communication form using a packet relay apparatus of the present invention. This communication form represents an exemplary case of communication between LANs 11-1 and 11-2 by way of an IP network 18 such as WAN or Internet. The LAN 11-1 comprises a node 10-1 and routers 14-1 and 14-2. The LAN 11-2 comprises a packet relay apparatus 12 of the present invention in addition to a node 10-2 and routers 16-1 and 16-2. The packet relay apparatus 12 includes two 10-BASSET interfaces 2, one of which is associated with the node 10-2 side and the other of which is associated with the routers 16-1 and 16-2 side. Herein, the node 10-2 side when viewed from the packet relay apparatus 12 of the present invention is defined as the inside, whereas the routers 16-1, 16-2 side is defined as the outside. By providing the LANs 11-1 and 11-2 with the routers 14-1, 14-2 and 16-1, 16-2, respectively, in this manner, interface protocol based communications between the two LANs 11-1 and 11-2 can be effected by way of paths 20-1 and 20-1 extending through the respective routers. Upon receipt of a packet from the node 10-2, the packet relay apparatus 12 of the present invention disposed in the LAN 11-2 classifies an application to which the packet belongs and provides a control of the communication path on a class-by-class basis. This embodiment makes use of the path 20-1 for the business application communication, i.e., for relatively important communication of the port No. 472 with TCP-IP protocol, but uses the path 20-2 for the other types of application communications. By using the path 20-1 as the path dedicated to the important communications such as the business application communication in this manner, it is possible to achieve a band assurance and a response assurance. The packet relay apparatus 12 of the present invention makes a periodical check of communications through the paths 20-1 and 20-2, and if it is detected that the communication has become impossible, then it changes over all the communications to be made through the normal path. If it is detected that the path 20-1 business application communication for example has become impossible, all the communications are changed over to be made through the path 20-2 whereby the path 20-2 can serve as a backup path of the path 20-1, thus assuring communication reliabilities.

Figure 6:
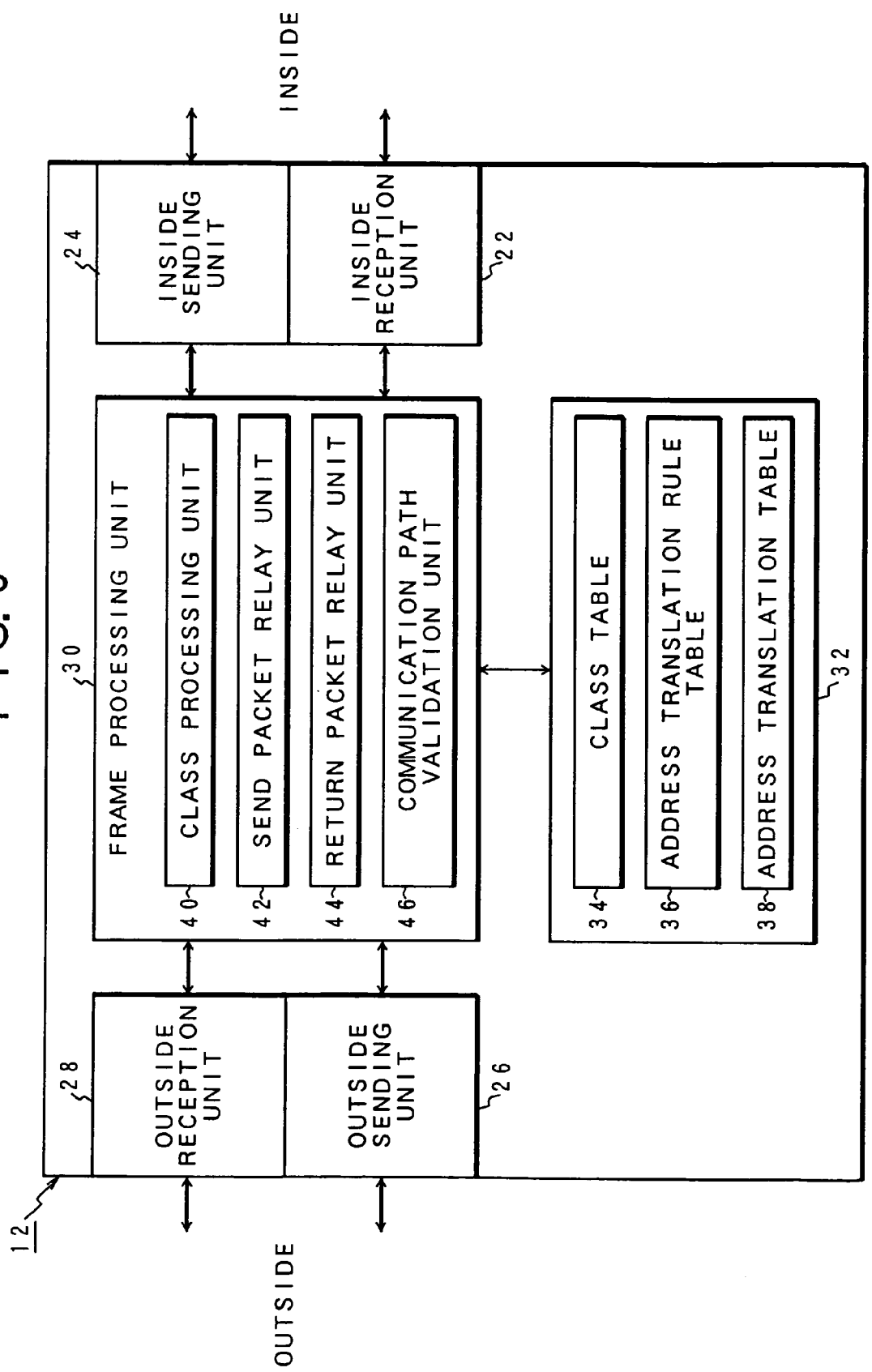
FIG. 6 is a function block diagram of a packet relay apparatus of the present invention provided in FIG.

FIG. 6 is a function block diagram of the packet relay apparatus 12 disposed in the LAN 11-2 of FIG. 5. The packet relay apparatus 12 is provided with ports acting as physical interfaces or logical interfaces with the outside toward the LAN 11-1 and the inside toward the LAN 11-2. More specifically, the packet relay apparatus 12 is provided with an inside reception unit 22 and an inside sending unit 24 that act as the inside interface ports. It is also provided with an outside sending unit 26 and an outside reception unit 28 that act as the outside interface ports. The packet relay apparatus 12 further comprises a frame processing unit 30 that serves to perform inside-outside packet relay processing and that is provided with processing features of a class processing unit 40, a send packet relay unit 42, a reply packet relay unit 44 and a communication path validation unit 46. The frame processing unit 30 is associated with a table storage unit 32 that includes a class table 34, an address translation rule table 36 and an address translation table 38. When the frame processing unit 30 relays a packet from inside to outside, the relay processing is effected by the class processing unit 40 and the send packet relay unit 42. The procedure of this inside to outside packet relay processing is as follows.

I. Refer to the class table 34 to retrieve a class to which the packet belongs;
II. Refer to the address translation rule table 36 to perform an address translation into a network address corresponding to the class;
III. Refer to the address translation rule table 36 to send a packet to a gateway corresponding to the network address;
IV. Update the address translation table 38.

The inside to outside packet relay processing is described as follows in conjunction with the tables. First, in order to retrieve a class to which the packet belongs, reference is made to the class table 34 depicted in FIG. 7. The present invention employs the concept of "class" to classify the packets depending on the applications. As shown in the class table 34 of FIG. 7, the class consists of class name, protocol type, inside address and port No., outside address and port No. and status. Since the communication path 20-1 is used for the business application having the port No. 472 with the TCP/IP protocol, with the communication path 20-2 being used for the other applications, on the first line of the class table 34, "business", "TCP", and "472" are entered into the class name, protocol type and inside port No., respectively, with the other addresses and port No., having "all" entered therein. For the other than the business application, "default" is entered into the class name, with "all" being entered into the protocol type, inside and outside addresses and port Nos.

Figure 8:
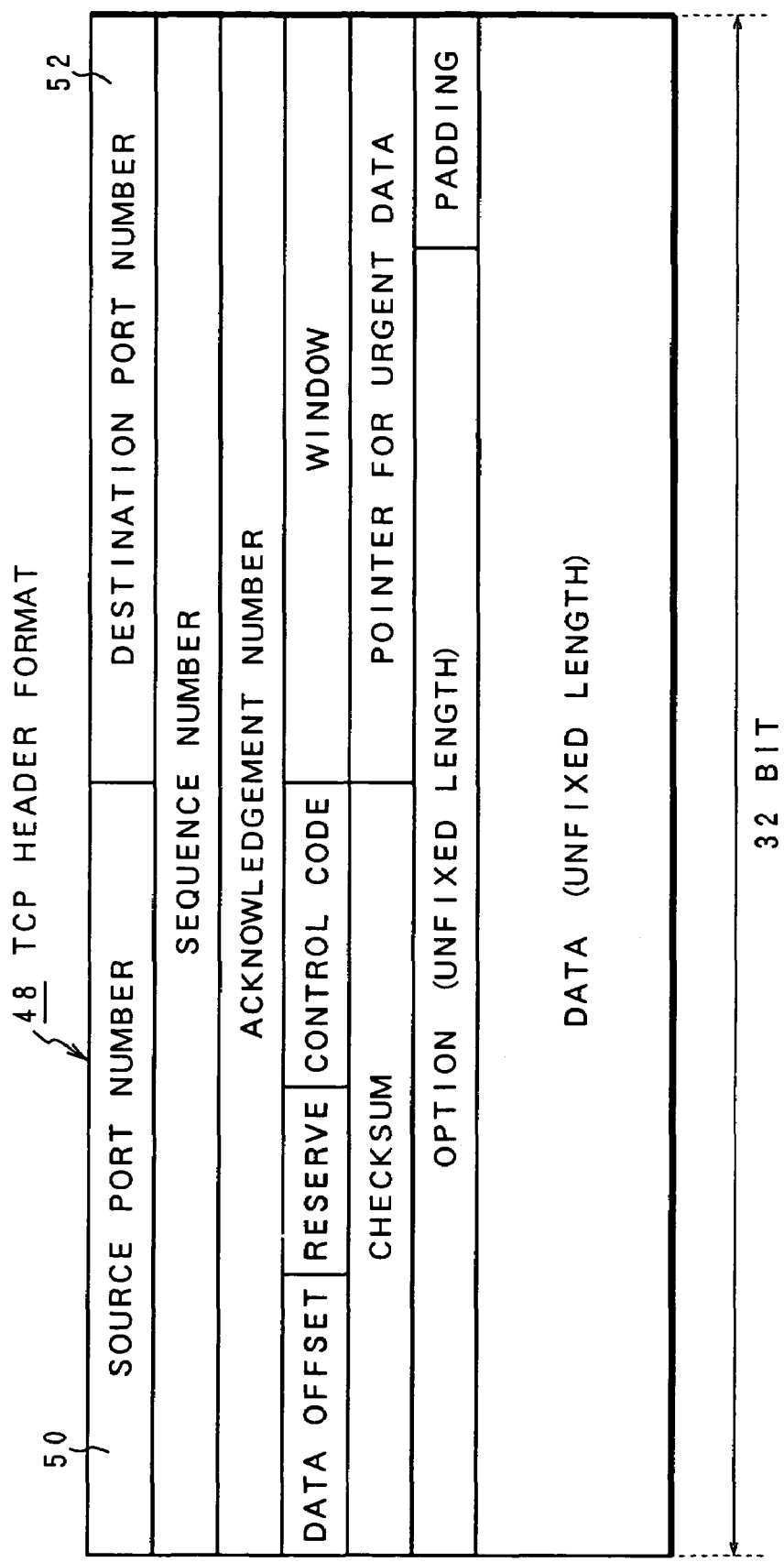
FIG. 8 is an explanatory diagram of a TCP header format.

Herein, the inside and outside port Nos. of the class table 34 are field names of a TCP header format 48 of FIG. 8 and of a UDP header format 54 of FIG. 9. In the TCP header format 48 of FIG. 8 for example, the source port No. 50 results in the inside port No. and the destination port No. 52 results in the outside port No. In the case of the UDP header format 54 of FIG. 9 as well, the source port No. 56 represents the inside port No. and the destination port No. 58 represents the outside port No. The protocol type and inside and outside addresses of the class table 34 are arranged in the IP protocol header.

In the class processing unit 40 provided in the frame processing unit of FIG. 6, upon the receipt of the packet from the inside, the class table 34 is referred to by the combination of the protocol type obtained from the reception packet and the inside and outside port Nos. so that determination is made of the corresponding class name, e.g., the class name "business" or "default". After the determination of the application class to which the packet to be relayed from inside to outside belongs through the reference to the class table 34 of FIG. 7, reference is made to an address translation rule table 36 depicted in FIG. 10 to perform the address translation of the packet source address into the network address corresponding to the class. The address translation rule table 36 of FIG. 10 includes the class name, address translation and gateway. In the class name "business", the address translation "10.1.2.0" and the gateway "10.1.2.1" are set whereby communication is made by use of the path 20-1 of FIG. 5. In contrast with this, the address translation "10.1.3.0" and the gateway "10.1.3.1" are entered for the class name "default" so that communication with the LAN 11-1 is effected by use of the path 20-2 shown in FIG. 5. It is to be noted that each address entered into the address translation rule table 36 will become clear from the description which will be made later.

After the address translation corresponding to the class name of the address translation rule table 36 of FIG. 10, the resultant packet is sent to the gateway corresponding to the thus translated network address. After the completion of the packet sending, updating is effected of an address translation table 38 as shown in FIG. 11. The address translation table 38 includes the protocol type, pre-translation address and port No. and post-translation address and port No. The address translation table 38 is initially vacant and after the completion of the packet relay, the results of the address translation are entered therein in succession. For this reason, after the second time or later, upon the reception of the packet from the inside, the address translation table 38 is first retrieved by use of the pre-protocol translation address and port No. Then the address and the port No. after the corresponding translation are acquired so that address translation can be effected only by the retrieval of the address translation table 38 for the same application packet from the same node, without using the class table 34 of FIG. 7 and the address translation rule table 36 of FIG. 10. In the absence of the entrance into the address translation table 38, the class name is determined by reference to the class table 34 of FIG. 7 and then the address translation and the gateway designation are effected by reference to the class name of the address translation rule table 36 of FIG. 10, after which inside to outside sending is effected.

The outside to inside packet relay processing by the reply packet relay unit 44 provided in the frame processing unit 30 of FIG. 6 includes address inverse translation by reference to the address translation table 38 shown in FIG. 11. That is, for the outside to inside reply packet relay, entrance has already been made of the pre and post protocol translation addresses and port Nos. corresponding to the address translation table 38 upon the packet relay from the inside to outside. Thus, the address translation table 38 is retrieved by the protocol destination address and port No. of the packet received from the outside, i.e., by the translated address and port No, to acquire the pre-translation address and port No., which is subjected to the address inverse translation for the sending to the inside.

Figure 1:
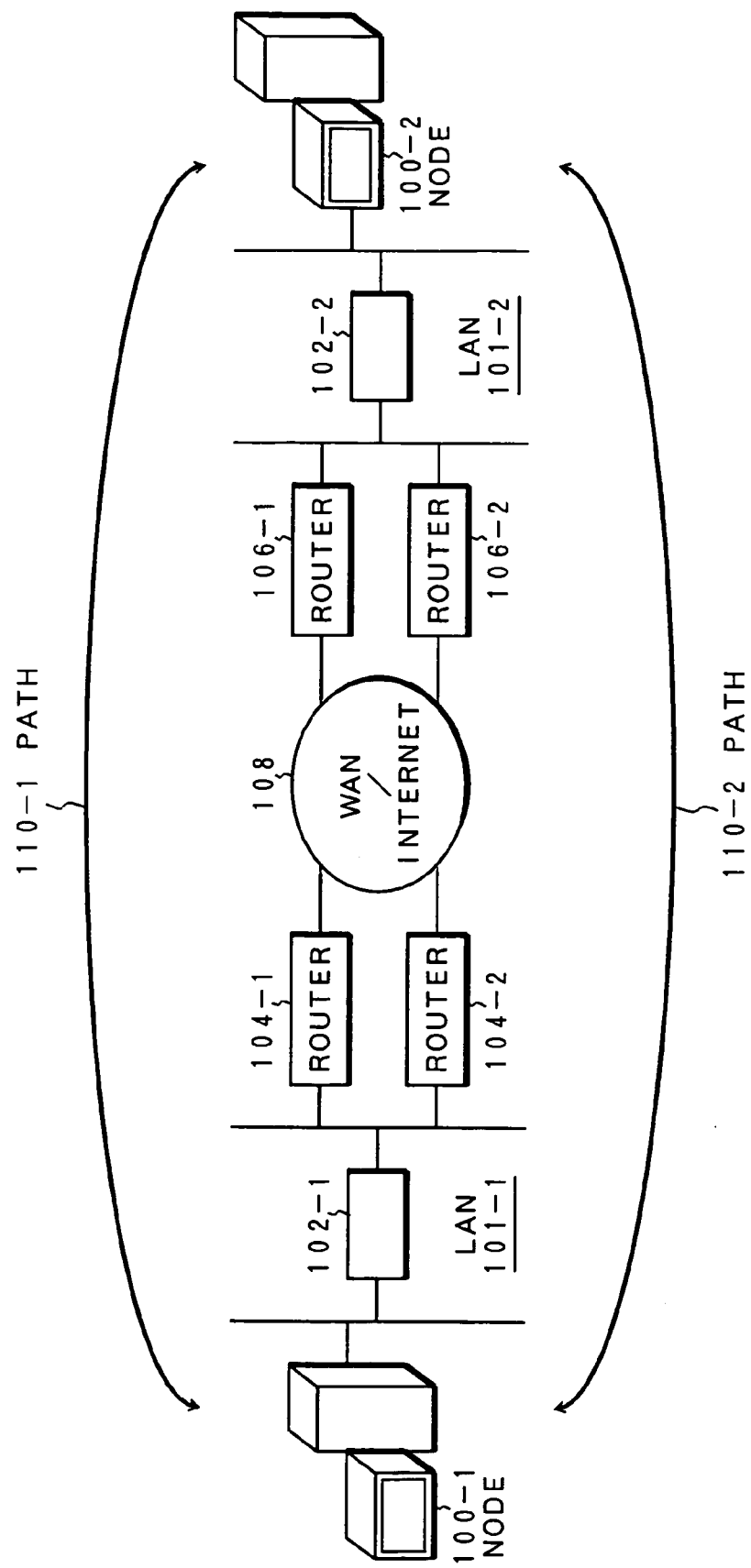
FIG. 1 is an explanatory diagram of a conventional communication form using different paths depending on applications.

Referring to FIG. 1, description will then be made of the class based communication path control by the packet relay apparatus 12 of the present invention. In cases where there exist two paths 20-1 and 20-2 extending from the LAN 11-2 to the destination LAN 11-1, the business application packet is translated into a subnet address (10.1.2.2) by the packet relay apparatus 12 of the present invention, and the other application packets are translated into a subnet address (10.1.3.2). This enables the destination LAN 11-1 to see the LAN 11-2 in the network of the IP subnet address differing depending on the class. For example, physically, for the business application the packet from the same LAN 11-2 looks as if it comes from the subnet address (10.1.2.2), whereas for the other application packets the packet looks as if it comes from the subnet address (10.1.3.2). As a result of this, the LAN 11-2 allows the business application packet to be returned to the subnet address (10.1.2.2) and allows the other application packets to be returned to the subnet address (10.1.3.2). Such a communication separately using the two paths 20-1 and 20-2 on a class basis follows the ordinary IP routing technique, so that mere arrangement of the packet relay apparatus of the present invention on the LAN 11-2 side achieves the path control separately using the paths 20-1 and 20-2 on a class basis corresponding to the type of the applications.

Herein, a case is exemplarily shown where the address configuration in the FIG. 5 communication form is that of FIG. 12 for example. The address configuration of FIG. 12 includes nodes 10-1, 10-2 and routers 14-1, 14-2, 16-1 and 16-2, as well as the packet relay apparatus 12 associated with the internet, address and the network mask. In this case, the network mask serves to extract the network address portion of the address, with the address consisting of 8-bit four blocks, with the network mask having first three blocks of bit 1, namely, of 255 in decimal, and having last block of 0. Thus, by acquiring AND of the address and the network mask, a true network address can be extracted. Herein, the nodes 10-1, 10-2, the routers 14-1, 14-2, 16-1, 16-2 have address configurations in conformity with the ordinary IP protocol, and the packet relay apparatus 12 of the present invention allows the inside to have a single address for the node 10-2 and allows the outside to have two addresses "10.1.2.2" and "10.1.3.2" for the paths 20-1 and 20-2.

FIGS. 13A to 13F each show routing tables into which is entered the path information of the routers 14-1, 14-2, 16-1, 16-2 and the nodes 10-1, 102 in the communication form of FIG. 1. Each routing table includes a destination subnetwork, a mask and a gateway. In case of the routing table of the router 14-1 of FIG. 13A for example, entered as the routing information for the node 10-1 are destination subnetwork "10.1.1.0", network mask "255.255.255.0" and the gateway "direct". Entered as the routing information for the LAN 10-2 are destination subnetwork "10.1.2.0", network mask "255.255.255.0" and the gateway "router 16-1". The same applies to the other routing tables of FIGS. 13B to 13F, although the routing table of the node 10-2 of FIG. 13F allows packet relay apparatus 12 inside address "10.10.10.1" as the gateway to be entered with the subnetwork "0.0.0.0 (default)" and the mask "0.0.0.0".

Following is the description of the processing actions of the packet relay apparatus 12 in accordance with the present invention when the node 10-2 makes a business application communication with the node 10-1 in the communication form of FIG. 1. First, the node 10-2 having an address "10.10.10.10" sets a destination address "10.10.10.1" for the packet relay apparatus 12 of the present invention acting as the gateway. Upon receipt of a packet from the node 10-2, the packet relay apparatus 12 having the inside address "10.10.10.1" refers to the address translation table 38 of FIG. 11 to retrieve the protocol type, address and the port No. In this case, unless the address translation table 38 contains any communications to be retrieved, then the class table 34 of FIG. 7 is retrieved through the combination of the of the reception packet protocol type (TCP) and port No. "472", to acquire a class name "business". Then the address translation rule table 36 of FIG. 10 is retrieved by the class name "business" acquired from the class table 34, to acquire an address translation "10.1.2.0" and a gateway "10.1.2.1". Thus, the source node 10-2 address "10.10.10.10" of the packet is translated into the address "10.1.2.10" acquired from the address translation table 36, which result is entered into the address translation table 38 of FIG. 8. Then the address translated packet is sent to the router 16-1 that results in the gateway of the address "10.1.2.1" acquired from the class name "business" of the address translation table 36. Thus, in conformity with the IP protocol routing rule, the packet from the router 16-1 passes through a WAN/internet 18 a router 14-1, with the address "10.1.1.10" arriving at the node 10-1. The node 10-1 executes the business application based on the reception packet data and sends a reply packet toward the source node 10-2 address "10.1.2.10 " translated in compliance with the application class. The reply packet is relayed in conformity with the ordinary routing rule and arrives at the packet relay apparatus 12 by way of the router 16-1. The packet relay apparatus 12 retrieves the address translation table 38 of FIG. 11 with the reply packet protocol type "TCP", the source address "10.1.2.10" and the destination port No. "2000", to acquire the pre-translation address "10.10.10.10"

and the port No. "5000", to restore the source address to its original state. Then the packet relay apparatus 12 relays the returned destination address reply packet to the node 10-2 of address "10.10.10.10". In this manner, the packet relay apparatus 12 of the present invention performs an address translation into two or more network addresses whereby an actually single address "10, 10, 10, 0" network LAN 11-2 looks virtually to have two or more subnetworks of addresses "10.1.2.0" and "10.1.3.0" for example for the other network LAN 11-1, thereby allowing a separate use of two or more paths by use of the existing routing technique. More specifically, the node 10-1 of the LAN 11-1 allows the physically same packet from the LAN 11-2 to look like a packet from the address "10.1.2.0" in case of the class "business", but look like a packet from the address "10.1.3.0" for the other classes. For this reason, without performing any special processing the node 10-1 of the LAN 11-1 normally returns the packet from the address "10.1.2.0" to the address "10.1.2.0", i.e., to the router 14-1 that results in the gateway of the address "10.1.1.1" On the other hand, the packet from the address "10.1.3.0" is returned to the address "10.1.3.0", i.e., to the router 14-2 that results in the gateway of the address "10.1.1.2". It is thus possible to separately use the paths 20-1 and 202 for each class corresponding to the type of the application. In particular, for the node 10-1 of the LAN 11-1 that is a destination of a packet to be relayed by the packet relay apparatus 12 of the present invention, it will suffice to return the packet in conformity with the packet destination address as in the conventional manner irrespective of the presence of the packet relay apparatus of the present invention, without any need to vary the packet destination with the recognition of the difference of the application by the node 10-1 itself.

FIG. 14 is a flowchart of the packet relay processing from the inside to the outside effected by the packet relay apparatus 12 of the present invention shown in FIG. 7. First, if a packet is received from the inside in step S1, then a check is made in step S2 to see if it has already been entered in the address translation table 38. If it has not yet been entered in the address translation table 38, then the procedure goes to step S3 in which the class table 34 is retrieved to determine the class name. Then, in step S4 the address translation rule table 36 is retrieved by the class name, to acquire the network address and the gateway. Then in step S5, the packet source address received from the inside is translated into the network address acquired from the address translation rule table 36, after which in step S6 the packet destination MAC address is translated into the MAC address of the gateway acquired in the step S4. Then in step S7, the address translation results are entered into the address translation table 38, and in step S8 the packet is sent to the outside.

Figure 15:
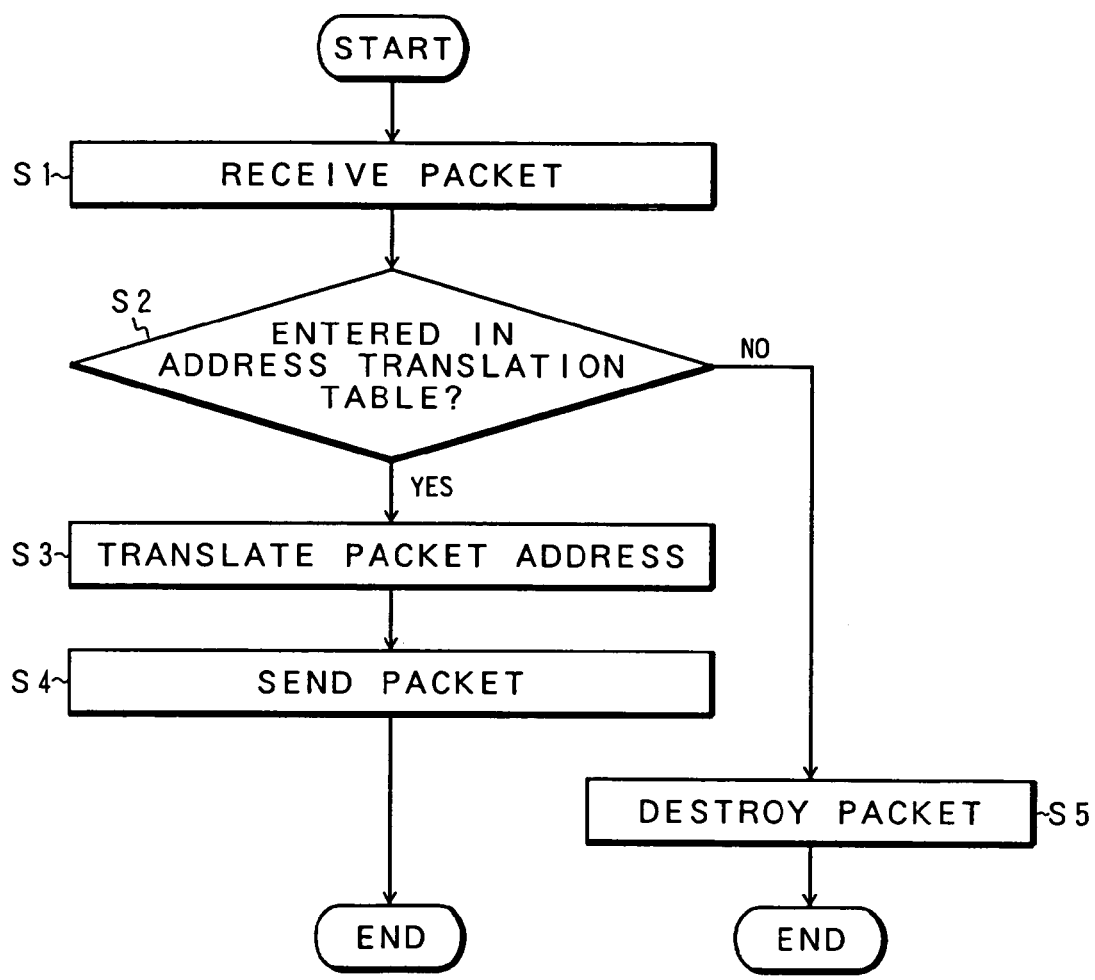
FIG. 15 is a flowchart of an outside to inside packet relay processing in accordance with the present invention.

FIG. 15 is a flowchart of outside to inside packet relay processing effected by the packet relay apparatus 12 of FIG. 6. If a packet is received from the outside step S1, then a check is made in step S2 to see if it has already been entered in the address translation table 38. If affirmative, then the procedure goes to step S3 in which the packet destination address is translated into the original address, and in step S4 the packet is sent to the inside. If it has not yet been entered in the address translation table 38, then the packet is discarded in step S5.

Figure 2:
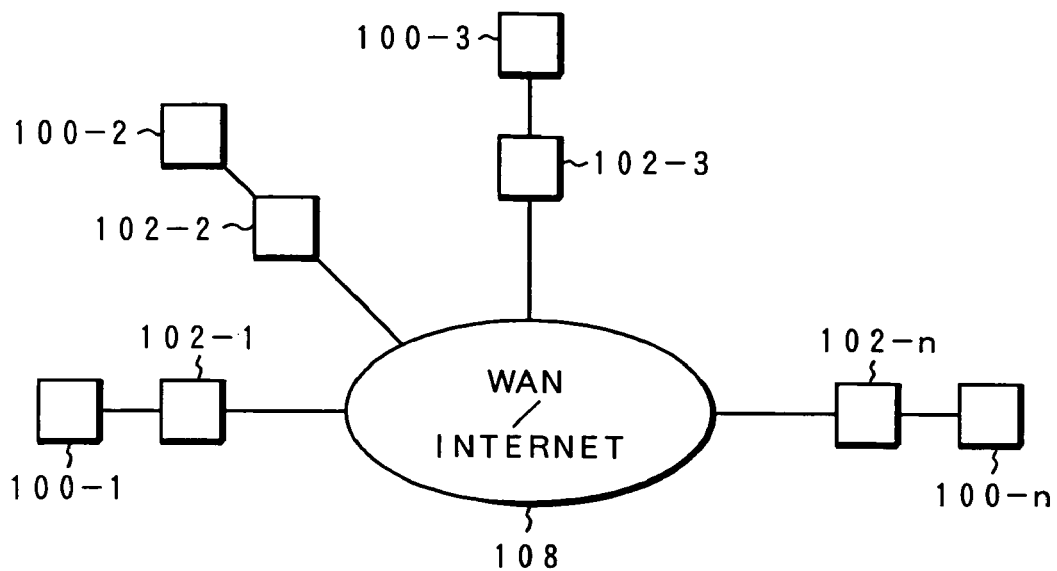
FIG. 2 is an explanatory diagram of a network having the communication form of FIG. 1.
Figure 3:
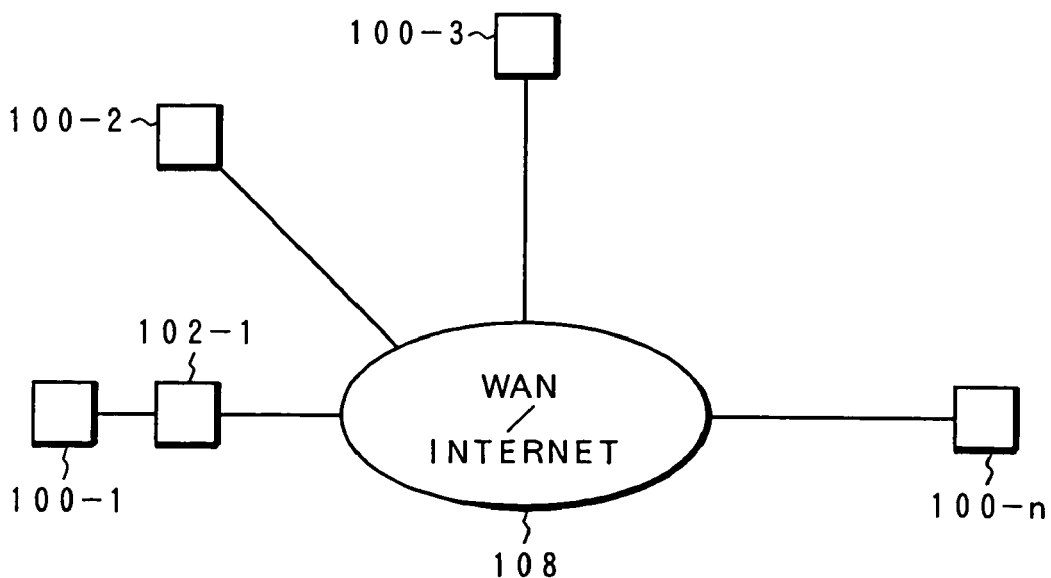
FIG. 3 is an explanatory diagram of a network provided with a relay apparatus using different paths depending on specific applications.
Figure 4:
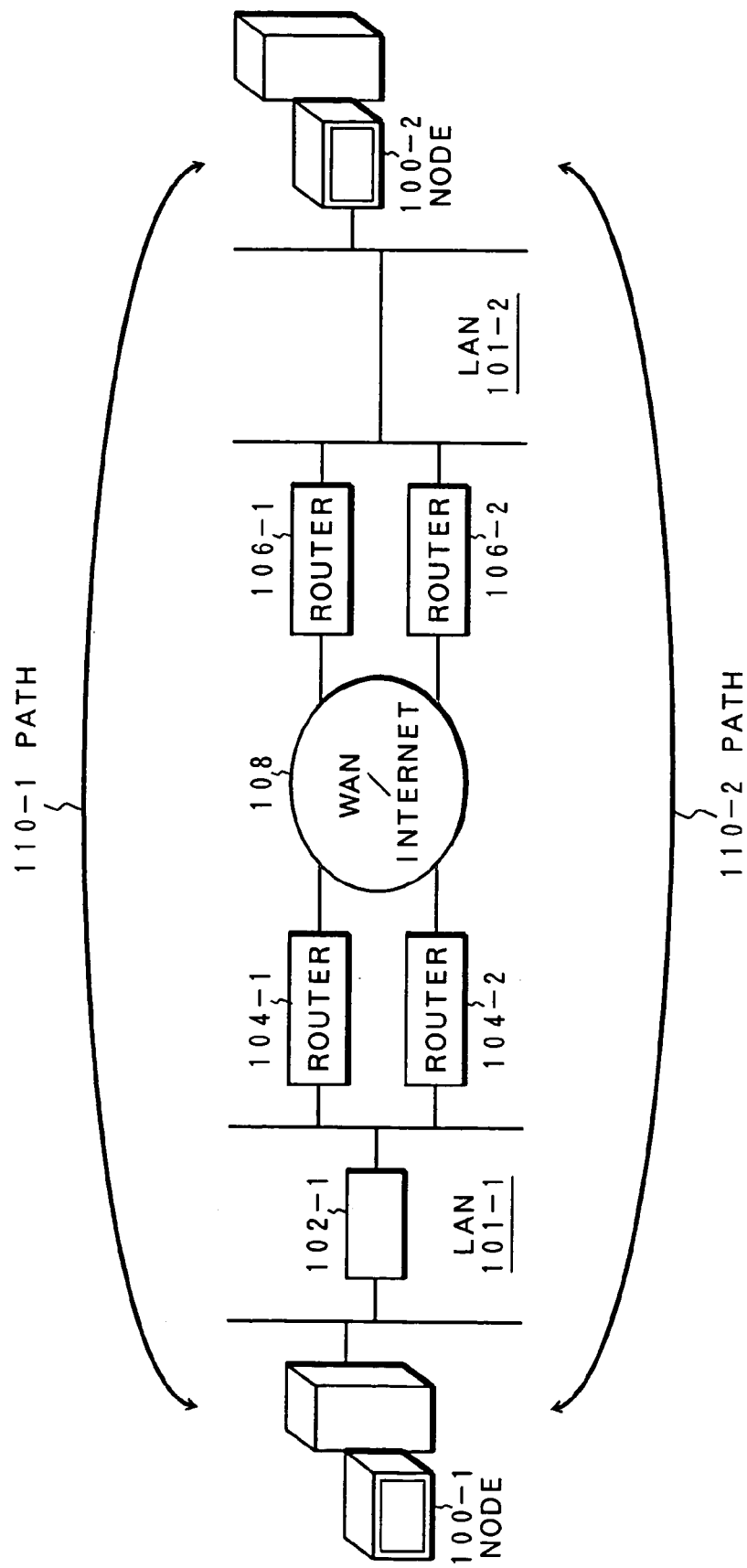
FIG. 4 is an explanatory diagram of a communication form of FIG. 18.

Description will then be made of processing effected by the communication path validation unit 46 provided in the frame processing unit 30 of the packet relay apparatus 12. The communication path validation unit 46 makes a periodical validation of whether communication is possible or impossible to a specific destination under the class based path control, and if it impossible communication is judged, the path is changed over. The periodical validation processing for the specific destination effected by the communication path validation unit 46 includes periodically validating whether the communication is possible or impossible by use of an ICMP echo packet (a communication validation function packet of the internet protocol). In order to validate the path communication, use is made of a self address (source address) of the same network address as that of the gateway of the path to be validated. In the validation processing of the path 20-1 of FIG. 2 for example, the packet relay apparatus 12 uses the self address "10.1.2.2" as the destination address, to send an ICMP echo packet to the address "10.1.1.10" node 10-1 as a specific destination. Herein, the corresponding number of self addresses to the number of paths formed between it and the specific destination are provided for the communication validation of the packet relay apparatus stands 12. In case of FIG. 1, due to the presence of the two paths 20-1 and 20-2, the self addresses "10.1.2.2" and "10.1.3.2" are possessed. That is, the number of the self addresses is equal to the number of the paths, and hence to the number of gateways and thus the number of the network addresses. The ICMP echo packet sent for the path communication validation has an ICMP format 60 as in FIG. 16. The ICMP packet is a function well known in the "Ping" program. "Ping" is a program by which it is judged whether communication is possible or impossible by sending a Type=8 ICMP packet to a specific node, by use of a protocol function that the node which has received an ICMP packet of Type=8 (Request) in the IP header of the ICMP format 60 of FIG. 16 is required to return a Type=0 (Reply) ICMP packet. By sending such an ICMP echo packet, if it is judged that the path communication is impossible, the communication of that path is changed over to the other normal path communication. More specifically, the status provided in the class table 34 of FIG. 4 is rewritten from "fair" which is given for normal communication to "bad". When the status corresponding to the specific class name of the class table 34 is rewritten to "bad", no use is made of the address translation using the path corresponding to the class name having the status "bad".

Following is a specific description of the path validation processing effected of the communication path validation unit 46 with reference to FIG. 1. First, the packet relay apparatus 12 periodically sends an ICMP echo packet to the node 10-1. In this case, it is necessary to check whether the path 20-1 is possible for communication, and hence the packet relay apparatus 12 uses "10.1.2.2" as the source self address and sends an ICMP echo packet to the router 16-1 with the destination address of the node 10-1 address "10.1.1.10". By the ordinary routing technique, the ICMP echo packet can arrive at the destination address "10.1.1.10" node 10-1. The node 10-1 sends an ICMP reply packet toward the source address "10.1.2.2". The ICMP reply packet thus arrives at the packet relay apparatus 12 by way of the path 20-1. If at that time the ICMP reply packet from the node 10-1 cannot return to the packet relay apparatus 12 due to the presence of any obstacles on the path 20-1, the packet relay apparatus makes a judgment that the path 20-1 is impossible for communication and changes over the business application communication using the path 20-1 to one using the path 20-2 which has hitherto been used for the other application communications. This path changeover procedure is as follows.

If the ICMP reply does not return by the time-out, the packet relay apparatus 12 sends ICMP echo packets in a successive manner by the predetermined number of times. Nevertheless, if no ICMP reply packets return, the packet relay apparatus 12 retrieves the class name "business" using the path 20-1 by the "10.1.2.1" gateway from the address translation rule table 36 of FIG. 7 and rewrites the status of the thus retrieved class name "business" of the class table 34 of FIG. 4 to "bad". If the status of the class table 34 is "bad" upon the class retrieval, the packet relay apparatus 12 ignores that class and performs no address translations. Thus, after the entry of the status "bad" into the class table 34, the packets belonging to the class name "business" are changed over to the communication using the path 10-2.

FIG. 17 is a flowchart of path communication validation processing effected by the packet relay apparatus 12 of the present invention. First, in step S1 an ICMP echo packet is sent toward a specific destination node on a communication path, and in step S2 reception of an ICMP reply packet from the destination is waited for. In step S3, a check is made to see whether the ICMP reply packet has been received or not, and if affirmative, then in step S4 an unreception counter is reset to zero, to complete the processing. If in step S3 the time-out occurs as a result of no reception of any ICMP reply packet within a predetermined period of time, then the procedure goes to steps S5 in which the unreception counter is incremented by one. Then in step S6 a check is made to see whether the sending count is the maximum value or not, and if negative, then the procedure returns to step S1 to again send an ICMP echo packet. If in step S6 the sending count upon no reception of the ICMP reply packet has reached the maximum value, then the procedure goes to step S7 in which the class name using that gateway is retrieved from the address translation table 38. Then in step S8, the status of the class of the class table 34 is altered to "bad", to perform the path changeover for the subsequent steps. Such a packet relay apparatus 12 in accordance with the present invention is not limited to the FIG. 1 form but is applicable to any form of networks as long as it is the IP network. For example, application to an ATM network, a frame relay, etc., is also feasible since the packet relay apparatus 12 of the present invention is applicable as long as the path is logically plural, irrespective of the physical number thereof.

Figure 18:
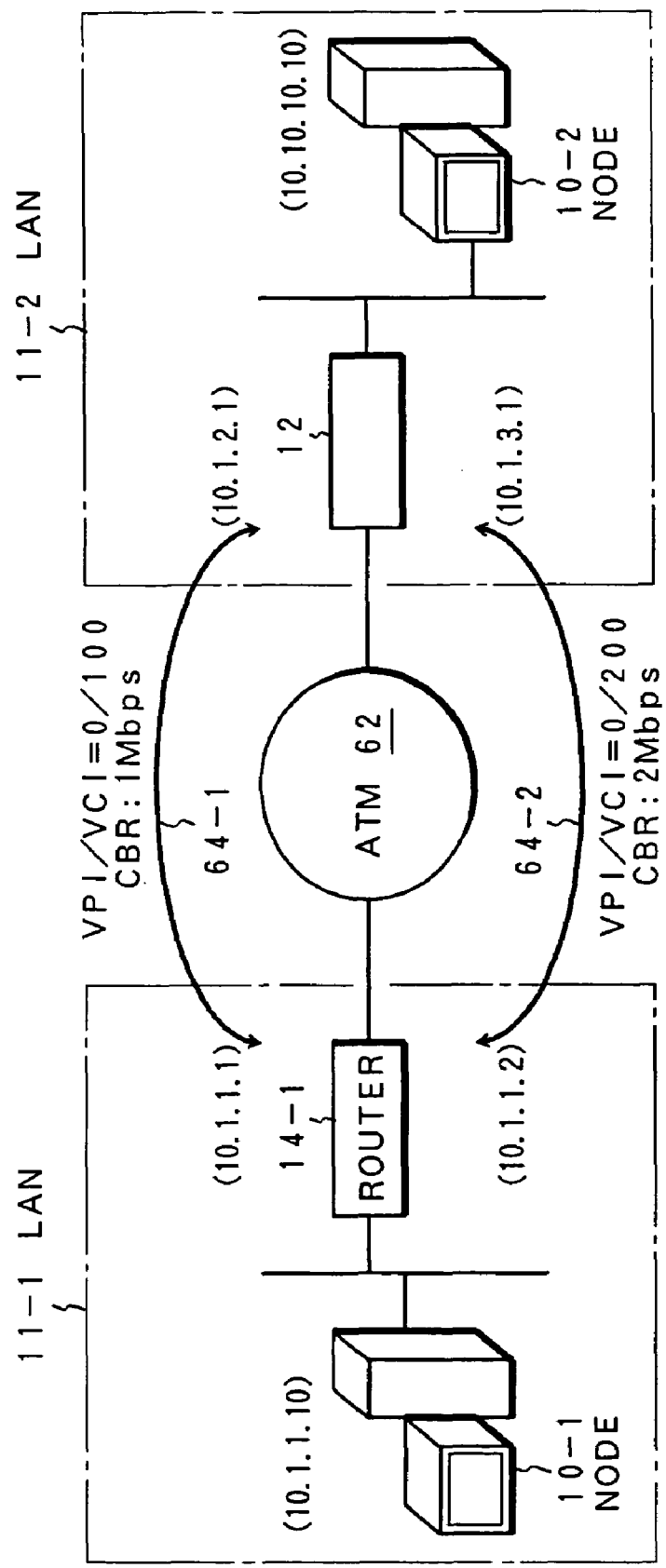
FIG. 18 is an explanatory diagram of a communication form in cases where the present invention is applied to an ATM network.

FIG. 18 is an explanatory diagram of the communication form in the cases where the packet relay apparatus 12 of the present invention is applied to the ATM network. In this form, the communication between the LANs 11-2 and 11-1 is implemented by way of an ATM network 62. The LAN 11-1 is provided with the node 10-1 and the router 14-1, and the LAN 11-2 is provided with the packet relay apparatus 12 of the present invention. In such an ATM network 62, a plurality of paths 64-1 and 64-2 are disposed for the same destination so that ABR, VBR, CBR, UBR or other service level and assurance band parameters are provided for each of the paths 64-1 and 64-2, to achieve a utilization of a securer quality of service QOS. Herein, with a virtual path ID (VPI)=0 and a virtual circuit ID (VCI)=100, the path 64-1 is set with CBR (Constant Bit Rate) of 1 Mbps, and simultaneously the path 64-2 is formed with VPI/VCI=0/200 and CBR of 2 Mbps. In this case, for the application class name "business", the packet relay apparatus 12 of the present invention allocates a subnetwork address "10.1.2.1" to the path 64-1 and allocates a subnetwork address "10.1.3.1" to the path 64-2, whereby the LAN 11-2 looks to have two different subnets when viewed from the LAN 11-1, to thereby establish a communication with the paths 64-1 and 64-2 that are controlled on a class-by-class basis.

In the case of the frame relay for packet interchange as well, similar to the case of FIG. 18, the LAN 11-2 on one hand is provided with the packet relay apparatus 12 of the present invention so that the paths can separately be used for each class of the application, thereby assuring the service level such as CIR. In the communication form of FIG. 18, the packet relay apparatus 12 provided in the LAN 11-2 allocates different subnet addresses on an application class-by-class basis, although the LAN 11-2 need not necessarily be subjected to allocation of the subnet addresses differing depending on the class. Instead, class-by-class differing IP addresses may be allocated to obtain a terminal type connection whereby class based communication path control can be implemented similar to the case of the provision of the packet relay apparatus 12 of the present invention. More specifically, when viewed from the LAN 11-1, the business application from the LAN 11-2 looks like a packet from the IP address "10.1.1.1" and the other applications look like packets from the IP address "10.1.1.2", so that as a result of viewing the packet IP address, the router 14-1 has merely to relay the packet to the paths 64-1 and 64-2 having different VCIs so that the packet passes through the paths 64-1 or 64-2 depending on the applications, to thereby make it possible to implement the control of the path on an application class basis.

As discussed hereinabove, according to the present invention, the application is classified to provide a class based communication path control, whereby a plurality of paths for the same destination can separately be used depending on the applications or communication node addresses. For example, a dedicated path may be allocated to relatively important communication such as business applications to thereby realize the band assurance and response assurance, thereby implementing an appropriate grading of the communication paths depending on the quality of service QOS that is a lower layer communication technique of the internet protocol.

It will be appreciated that the present invention is not limited to the above embodiments and that it embraces any appropriate variants without impairing the objects and advantages thereof. The present invention is not restricted by the numerical values indicated in the above embodiments.

What is claimed is:

1. A packet relay apparatus for relaying packets between a node and an IP network, said apparatus comprising:
  a class processing unit arranged to classify send packets to be relayed to said IP network depending on the types of applications, said class processing unit making allocation of different virtual IP addresses on a class by class basis;
  a send packet relay unit arranged to translate source addresses of said send packets to be relayed to said IP network into virtual IP addresses on a class by class basis, said send packet relay unit establishing IP communication paths on a class by class basis in said IP network; and
  a reply packet relay unit arranged to inversely translate destination addresses of reply packets from said IP network passing through said IP communication paths on a class by class basis into original addresses by reference to the results of address translation effected by said send packet relay unit.

2. A packet relay apparatus for relaying packets between a node and an IP network, said apparatus comprising:
  a class processing unit arranged to classify send packets to be relayed to said IP network depending on the types of applications, said class processing unit making allocation of different virtual IP addresses on a class by class basis;

a send packet relay unit arranged to translate source addresses of said send packets to be relayed to said IP network into virtual IP addresses on a class by class basis, said send packet relay unit establishing IP communication paths on a class by class basis in said IP network;

a reply packet relay unit arranged to inversely translate destination addresses of reply packets from said IP network passing through said IP communication paths on a class by class basis into original addresses by reference to the results of address translation effected by said send packet relay unit;

a class table having packet header information entered therein correspondingly to class names defining the types of said applications;

an address translation rule table having virtual IP addresses and path information entered therein correspondingly to said classes; and an address translation table having therein entered the results of address translation from said packet source addresses to said virtual IP addresses; and wherein said send packet relay unit upon receipt of a send packet to said IP network refers to said address translation table to retrieve a source virtual IP address, said send packet relay unit if there is no entry in said address translation table determining a class by reference to said class table and thereafter referring to said address translation rule table to retrieve a virtual IP address corresponding to said class, said send packet relay unit translating a send packet source address into said retrieved virtual IP address to enter the result of said address translation into said address translation table, and wherein said reply packet relay unit upon receipt of a reply packet from said IP network refers to said address translation table to retrieve a destination address corresponding to a destination virtual IP address, said reply packet relay unit inversely translating said destination virtual IP address of said packet into said retrieved destination address.

3. The apparatus according to claim 2, wherein said class table has protocol types, send packet source addresses and port Nos. and reply packet source addresses and port Nos. entered correspondingly to said class names, and wherein said class retrieval unit retrieves a class from a combination of a protocol type of a send packet to be relayed to said IP network and a port No.

4. The apparatus according to claim 3, wherein said class table has class names of a business application entered in the form of combinations of send packet TCP protocols and port Nos., said class table having all of the combinations of the other protocol types of said send packets and source port Nos. entered by class names of a default application.

5. The apparatus according to claim 2, wherein said address translation rule table has virtual IP addresses and gateway MAC addresses entered correspondingly to class names entered in said class table, and wherein said send packet relay unit retrieves a virtual IP address and a gateway MAC address corresponding to a class name retrieved from said address translation rule table.

6. The apparatus according to claim 2, wherein said address translation table has pre-translation source addresses and port Nos. and post-translation virtual IP addresses and port Nos. entered correspondingly to protocol types, and wherein said send packet relay unit translates a send packet source address into a virtual IP address retrieved from said address translation rule table or said address translation table, said send packet relay unit translating a destination MAC address into a gateway MAC address retrieved from said address translation rule table, and wherein said reply packet relay unit inversely translates a destination virtual IP address received from said IP network into a pre-translation source address retrieved from said address translation table.

7. The apparatus according to claim 2, further comprising:

a communication path validation unit arranged to make a periodical validation of communication through a communication path of said IP network by use of said virtual IP address.

8. The apparatus according to claim 7, wherein said communication path validation unit when detecting an abnormal of said communication path prohibits a retrieval of a class that uses said communication path, to make a changeover to use of a default communication path.

9. The apparatus according to claim 8, wherein said class table includes a status indicative of usable or unusable, and wherein said communication path validation unit when detecting an abnormal of said communication path sets unusable in said status of said class table to prohibit a class retrieval.

10. A method of relaying packets between an inside node and an outside IP network, said method comprising the steps of:

classifying send packets to be relayed to said IP network, depending on the types of applications, to allocate a different virtual IP address to each class;

translating source addresses of said send packets to be relayed to said IP network into virtual IP addresses on a class by class basis to establish IP communication paths on a class by class basis in said IP network; and inversely translating destination addresses of reply packets from said IP network passing through said IP communication path on a class by class basis into original addresses by reference to the results of address translation in said send packet relaying step.

* * * * *